United States Patent
Wüthrich

(10) Patent No.: US 8,511,592 B2
(45) Date of Patent: Aug. 20, 2013

(54) METHOD FOR DETERMINING THE LOAD OF A MILL

(75) Inventor: Christoph Wüthrich, Wiggiswil (CH)

(73) Assignee: Schaerer AG, Zuchwil (CH)

( * ) Notice: Subject to any disclaimer, the term of this patent is extended or adjusted under 35 U.S.C. 154(b) by 278 days.

(21) Appl. No.: 13/057,289

(22) PCT Filed: Jul. 28, 2009

(86) PCT No.: PCT/EP2009/059740
§ 371 (c)(1),
(2), (4) Date: Feb. 3, 2011

(87) PCT Pub. No.: WO2010/018060
PCT Pub. Date: Feb. 18, 2010

(65) Prior Publication Data
US 2011/0155829 A1    Jun. 30, 2011

(30) Foreign Application Priority Data

Aug. 12, 2008  (EP) .................................... 08162227

(51) Int. Cl.
*B02C 25/00* (2006.01)
*B02C 23/00* (2006.01)
(52) U.S. Cl.
USPC .............................................. 241/30; 241/35

(58) Field of Classification Search
USPC ............................................. 241/30, 35, 100
See application file for complete search history.

(56) References Cited

U.S. PATENT DOCUMENTS
2009/0236452 A1* 9/2009 Bolognesi et al. .............. 241/30

FOREIGN PATENT DOCUMENTS
DE          9005651 U1     7/1990
WO          2008/001403 A   1/2008

OTHER PUBLICATIONS
Internal Search Report dated Oct. 15, 2009.

* cited by examiner

*Primary Examiner* — Faye Francis
(74) *Attorney, Agent, or Firm* — Pearne & Gordon LLP

(57) ABSTRACT

Described and claimed is a method, in which the state of a mill, which consists of a stator and a rotor and is driven by an alternating current motor, is derived from the rotational speed of the mill work. The rotational speed is measured with the aid of a rotating component connected to the mill work in a torque-proof way, especially with a Hall sensor, which cooperates with a permanent magnet fastened to said component. The determined speeds—normal for a normal operation of the mill and zero or very low in the event a blockage of the mill work—are put in relation to the idling rotational speed, which is also determined and is put in relation to the mains frequency. The determined rotational speeds are stored, and can be displayed. When there is a blockage, an alarm can be sounded.

9 Claims, 1 Drawing Sheet

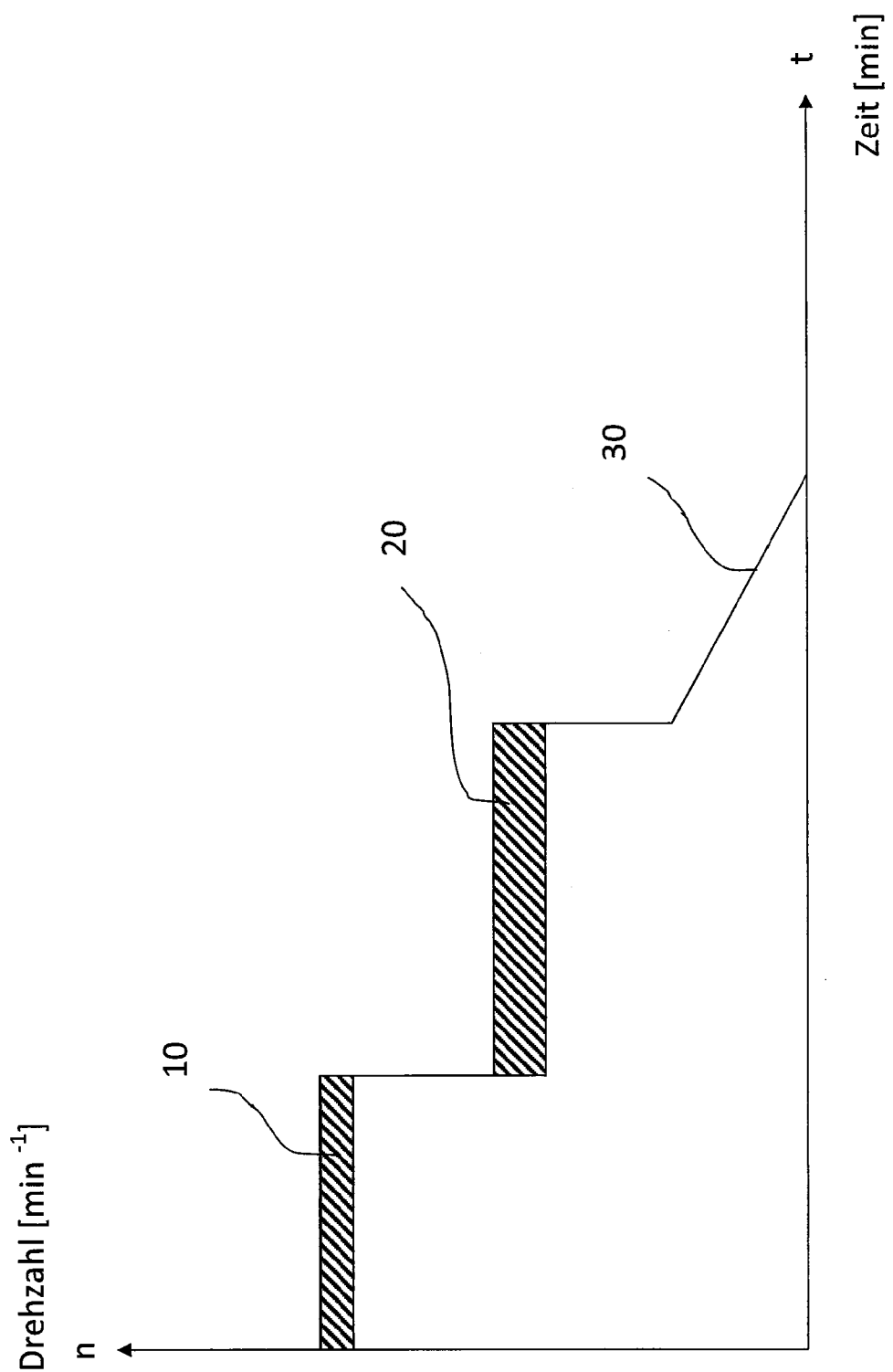

METHOD FOR DETERMINING THE LOAD OF A MILL

The invention relates to a method for determining the load of a mill, in particular a coffee mill, according to the preamble of claim 1.

The following description is directed to a coffee mill, for which the method according to the invention has a preferred application. The invention can however be applied without substantial changes to any mill in which a material to be ground is ground in a mill work between a fixed (stator) and a motor-driven rotating tool (rotor).

Mill works usually consist of metallic tools, more rarely also made of corundum (household flour mills). The milling effect is achieved through repeated milling in a mill gap which becomes increasingly constricted, which gap can usually be varied by axial shift of the rotor or stator. Milling is done by shearing action and/or friction effect. Such mill works are known, and have diverse applications.

The coffee mills in automatic coffee machines are driven by either direct current motors or by alternating current motors. The alternating current motor is thereby becoming more and more prevalent because it can be produced at a more reasonable price than a direct current motor. While the alternating current motor is easy to manufacture and can be operated directly with the alternating current of the grid, a direct current motor requires in manufacture more components such as commutator, brushes, two different windings or a winding and permanent magnets as well as an own supply system of transformer and rectifier.

During the milling step it is important to be able to check its course. This applies in particular to all mills in which no direct visual monitoring of the mill work is possible and also to cases in which a blockage of the mill work is caused by a foreign body which is hidden by further material to be ground. A checking of the correct operational state of the mill work is important in coffee mills because it happens again and again that the coffee bean reservoir is polluted by small stones. These small stones then block the mill work.

In the case of mills with direct current motors, the current draw is measured in order to be able to distinguish between the different operating states. At least three states can thereby be distinguished:

1. Within defined limits of the current draw, normal grinding can be assumed.
2. With electric currents over an upper limit, the mill is blocked or overloaded. In this case the user is usually asked to remove any foreign bodies from the mill.
3. When there are no longer any beans present, the current is less than the lower limit. The user is asked to replenish the beans.

With the use of alternating current motors, the monitoring takes a different form:

In many cases the content of the bean container is monitored by a light barrier. This has the advantage that an empty status signal is emitted as an advance warning and the beans can be refilled in time. This solution is rather costly, however, and prone to soiling. Moreover there is no possibility with this solution to check for blockage and overload.

With newer integrated circuits there also exists the possibility of measuring the current in an advantageous way. Fluctuating mains voltages and too minimal a difference between normal operation and idle running make these methods very problematic, however.

A drawback of the alternating current motor thus consists in that its current draw, or the potential difference (voltage drop) connected therewith, cannot be used for monitoring the state of the motor, this in contrast to direct current motors where the current draw rises with the delivered torque (quadratically).

The invention has as its object to specify a method for determining the load of a mill driven by an alternating current motor, in particular a coffee mill, with which method the state of the mill work under the most diverse operating conditions can be determined.

Such methods are already known. Thus the method which is described in the document JP 6-133868 determines the end of a grinding step through the phase shift which occurs at the grinding motor at this moment. The purpose of the determination is to grind always the same amounts of coffee for a portion.

Indicated in the document JP 4-352915 is a method with which the rotational speed of a motor of a coffee mill can be kept constant. This takes place through a corresponding phase control, i.e. a suitable phase shift, at the grinding motor.

Described in the German utility model G 90 05 651 is a machine for preparing coffee infusion in which the respective coffee quantity for a portion is measured in that the number of rotations of the mill work is determined, and the motor is stopped after reaching a preset counted measurand.

In none of the indicated documents is a method described or even merely suggested making it possible to determine the individual phases of grinding of a portion of coffee grounds and to indicate possible malfunctions, or in the case of malfunctions, to turn off the grinding motor.

The method according to the invention is defined in the characterizing part of claim 1. Preferred embodiments form the subject matter of dependent claims.

The invention is based on a measurement of the rotational speed of the mill work, i.e. its number of turns per unit of time. Such a measurement is not known from the state of the art.

The rotational speed of the mill work can be measured in different ways. For example, a mechanical element can be installed on a rotating component, which is connected to the mill work in a torque-proof way, which mechanical element during the rotation comes into contact periodically with a stationary switch element and thereby generates a pulse. A plurality of rotating and/or stationary elements can also be used.

Another possibility is the known optical rotational speed measurement with the aid of optoelectronic elements, which works in a non-contacting way.

Preferred according to the present invention is the use of a permanent magnet, which is disposed on the rotating element and co-operates with a stationary Hall sensor, in order to capture the rotational speed of the mill. This method, which also works in a non-contacting way, functions in the same way as with a flow meter; one pulse is obtained per revolution. Since the asynchronous alternating current motors run nearly mains-synchronously at idle speed, one has here a precise reference. The mains frequency is thus pretty much the most stable frequency there is in the electrical power supply. Reported to the control unit must only be which of the two frequencies to be found in the world is present, i.e. either 50 or 60 Hz. Through this precise reference, a relatively minimal drop in rotational speed, about 5 to 10%, can now be used to distinguish between grinding and idling.

The ascertainment of overload situations also becomes more problem-free because the rotational speed via a built-in flywheel mass, if applicable, is considerably more stable than the current draw. In combination with a measurement of the prevailing mains voltage, a control or even an automation of the mill settings would also be conceivable, such as e.g. the compensation for attrition of the mill work tools.

With a suitable design of the individual parts of the mill, in particular coffee mill, the method according to the invention makes possible the ascertainment of all possible operating conditions. This will be explained using an embodiment example, reference being made to the sole FIGURE of the attached drawing. A coffee machine is referred to in the example; such machines in which coffee is ground and the generated coffee grounds are further processed for preparation of an infusion are well known and will therefore not be described more closely.

In the coffee machine used, disposed on the shaft of an alternating current motor, which drives the mill work, is a disk-shaped flywheel mass. On the periphery of this mass a powerful permanent magnet is embedded in the disk. In the housing of the coffee machine, the disk faces a hall sensor in such a way that with each rotation of the disk flywheel a voltage pulse is induced in the sensor. In a way known per se, the pulses are conducted to an integrated circuit, which contains a clock, and the rotational speed of the flywheel mass is calculated.

Instead of the one permanent magnet, a plurality of magnets could also be used, for example two pieces which are disposed over a diameter of the disk so that two pulses, which the Hall sensor measures and passes on, correspond to one rotation.

First the mains frequency is communicated to the coffee machine by actuation of a corresponding selector switch. This is necessary just once. This setting can also be made already by the manufacturer.

The coffee machine preferably has a slide between the coffee bean container and the entrance to the mill work. This slide can be opened and closed by an electromagnet. It can thereby also be a multi-part, iris-diaphragm-shaped closure. Then the motor of the mill work is set in motion, the rotational speed is measured with the aid of the Hall sensor, and the measured value is stored. The idle-running speed is obtained in this way. Also this preparatory step does not have to be carried out before each grinding procedure, and can be postponed until a state in which the bean reservoir container is empty. Also for such embodiments of the method, no slide or closure of the container is needed.

Next, the rotational speed at which the normal grinding procedure takes place is determined and stored. This value is newly determined at particular intervals, and the already stored rotational speed value is updated. Since different rotational speed values can also be attributed to a change of the material to be ground, e.g. another type of coffee, or to an attrition of the mill work, a continuous storing of measured values can also be provided for, instead of the updating.

Also to be taken into account is that the rotational speed of the mill work changes when the fineness of the coffee grounds is changed. Therefore the invention provides for the rotational speed values to also be recorded as a function of the fineness of the ground product.

Finally, the case can arise where the mill work is completely or partially blocked by a foreign body or by wet coffee beans. In this case the rotational speed drops sharply and can be reduced to zero.

These conditions are roughly represented schematically in the form of a diagram in the FIGURE, the number of rotations n (e.g. in $min^{-1}$) being plotted against the time (e.g. in min).

The region 10 corresponds to idling. Here the rotational speed is high and changes only very little; fluctuation factors are the inner friction of the machine, which increases with time, and irregularities in the mains voltage. The width of the zone 10 is minimal.

With the normal grinding procedure, the rotational speed sinks to a value in the region 20. This region is wider than zone 10 because the number of rotations fluctuates to a rather high degree depending upon the type of coffee and the fineness set for the coffee grounds. Contributing to greater range of fluctuation is also an attrition of the mill work tools; this influence is rather minimal because an increased wear and tear (whereby the rotational speed rises) produces coarser coffee grounds, and the user will correspondingly adjust the degree of fineness of the grinding (whereby the rotational speed sinks a little again).

Should the mills run with great difficulty or be even blocked, the rotational speed sinks along the line 30, and can also assume a constant low value. In any case the triggering of an alarm and/or the stopping of the motor of the mill work is provided for in this state.

The stored rotational speed values can be displayed as such, or also together with their significance ("idling", "grinding", "blockage"), on a small display panel. It is also possible to pass on the stored values to a computer via a connection, which computer can find out the causes quickly in the case of a machine malfunction. Finally, the rotational speed values which approach a range limit in the rotational speed range "grinding" or exceed this limit can be used for automatic adjustment of the mill work.

The invention has been described above using the example of a coffee mill in an automatic coffee dispensing machine. As was already mentioned at the beginning, the invention can however be used in practically all mill works with rotor and stator to monitor and/or control these mill works. The individual steps of the described method can also be changed and if necessary transposed, and additional steps can be introduced, for instance a continuous or intermittent comparison of the measured rotational speed values with the mains frequency and a possible adjustment, or an automation of all or individual steps of the method. Such changes and additions, which are familiar to a person skilled in the art, fall within the scope of protection of the patent.

The invention claimed is:

1. A method for determining the load of a coffee mill, comprising the steps of: providing a mill work comprising a stator and rotor, driving said rotor of said mill work by means of an alternating current motor, measuring the rotational speed of said motor on a component of the coffee mill connected to the mill work in a fixed rotational relationship, and determining the load of said mill from the measurement values of said rotational speed relationship, wherein, in a first step, the idling speed of the mill work is determined in the absence of a material to be ground, and, in a second step, said idling speed is used as a reference value for said load determinations.

2. The method according to claim 1, wherein the idling speed is set in relation to the mains frequency after the nominal value of the mains frequency is selected and is communicated to the machine.

3. The method according to claim 1, wherein in the second step, the rotational speed of the mill work is determined during normal operation with a designated material to be ground, the determination taking place in each case as a function of the fineness of the ground material and also, if applicable, the degree of wear of the mill work.

4. The method according to claim 1, wherein with a rotational speed below the lowermost value of the rotational speeds measured according to claim 4 or with a rotational speed near zero or at zero, a blockage of the mill work is detected and the power supply of the motor is switched off.

5. The method according to claim 1, wherein the rotational speed of the mill work is determined using a device including a disk flywheel and a Hall sensor, the disk flywheel being connected to the mill and having at least one firmly attached permanent magnet which co-operates with the Hall sensor in such a way that upon passing of a magnet the sensor emits a pulse-type signal.

6. The method according to claim 1, wherein upon switching off of the motor as a result of a blockage of the mill work an acoustic signal is emitted.

7. The method according to claim 1, wherein all determined rotational speeds are registered in a retrievable way in a memory.

8. The method according to claim 1, wherein the operational state of the mill determined from the rotational speed is indicated optically.

9. The method according to claim 1, wherein the coffee mill is the coffee mill of a coffee machine.

* * * * *

UNITED STATES PATENT AND TRADEMARK OFFICE
CERTIFICATE OF CORRECTION

PATENT NO. : 8,511,592 B2
APPLICATION NO. : 13/057289
DATED : August 20, 2013
INVENTOR(S) : Christoph Wuthrich Page 1 of 1

It is certified that error appears in the above-identified patent and that said Letters Patent is hereby corrected as shown below:

In the Claims

Claim 6, column 5, line 4, please add -- work -- after "mill"

Signed and Sealed this
Fifteenth Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,511,592 B2
APPLICATION NO. : 13/057289
DATED : August 20, 2013
INVENTOR(S) : Christoph Wüthrich Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 276 days.

Signed and Sealed this
Fifteenth Day of September, 2015

Michelle K. Lee
*Director of the United States Patent and Trademark Office*